United States Patent [19]

Ono

[11] Patent Number: 5,233,693

[45] Date of Patent: Aug. 3, 1993

[54] FIRST-IN FIRST-OUT STORAGE FACILITY HAVING BYPASSING LOOP THEREOF

[75] Inventor: Kazuhiko Ono, Tokyo, Japan

[73] Assignee: NEC Corporation, Japan

[21] Appl. No.: 399,249

[22] Filed: Aug. 28, 1989

[30] Foreign Application Priority Data

Aug. 29, 1988 [JP] Japan .............................. 63-214217

[51] Int. Cl.⁵ .............................................. G06F 9/30
[52] U.S. Cl. ................................ 395/375; 364/239; 364/939.7
[58] Field of Search ..................... 395/375, 800; 364/200 MS File, 900 MS File, DIG. 1, DIG. 5

[56] References Cited

U.S. PATENT DOCUMENTS 3,551,895  1/1968  Driscoll .............................. 364/200
4,268,907  5/1981  Porter ................................ 364/200

Primary Examiner—David Y. Eng
Attorney, Agent, or Firm—Ostrolenk, Faber, Gerb & Soffen

[57] ABSTRACT

A first-in first-out storage facility for providing an instruction code stack is implemented by a combination of a first-in first-out register and an auxiliary storage register. A stream of instruction codes is successively pushed onto the first-in first-out register in a normal condition. However, an instruction code representative of, for example, an inspection of a system is steered to the auxiliary storage register rather than the first-in first-out register if an abnormal event takes place in the system, so that the instruction codes in the first-in first-out register are not required to be canceled so as to store the instruction code representative of the inspection, thereby enhancing the throughput of the code stream.

14 Claims, 6 Drawing Sheets

FIRST-IN FIRST-OUT STORAGE FACILITY HAVING BYPASSING LOOP THEREOF

FIELD OF THE INVENTION

This invention relates to a first-in first-out storage facility and, more particularly, to a first-in first-out storage facility incorporated in a data processing system for providing an instruction or data code stack.

DESCRIPTION OF THE RELATED ART

A typical example of a first-in first-out storage facility incorporated in a data processing system is illustrated in FIG. 1 and used as an instruction stack. The instruction stack largely comprises a first-in first-out register 1 associated with an input latching circuit 2, an internal register 3 coupled between the first-in first-out register 1 and an internal bus 4, and a controlling circuit 5.

The controlling circuit 5 is implemented by two AND gates 6 and 7, and the AND gate 6 produces a write control signal WCL in the concurrent presence of a transfer signal TR1 and a write timing signal WR. On the other hand, the AND gate 7 produces a latch signal in the concurrent presence of the write timing signal WR and a read-out signal RD. A latch signal LTCH2 as well as the transfer signal TR are selectively supplied to the latching circuit 2 for controlling a code stream The first-in first-out register 1 is responsive to the write control signal WCL for accumulation of instruction codes, and delivers the accumulated instruction codes in the presence of the read-out signal RD on the first-in first-out basis. The first-in first-out register 1 is further operative to produce an overflow warning signal OF when it is filled with the instruction codes. The first-in first-out register 1 is further responsive to a reset signal RST, and all of the instruction codes accumulated therein are cleared.

A transfer signal TR2 as well as the latch signal LTCH1 are selectively supplied to the internal register 3 for relaying the instruction code to the internal bus 4.

Assuming now that the instruction stack shown in FIG. 1 is associated with an execution unit (not shown) incorporated in a floppy disk controlling system, various instruction codes are successively fetched by the execution unit, and pushed onto the instruction stack. These instruction codes are, by way of example, representative of a specify command (SPY) for initializing the controller, a recalibration command (RCL) for returning the magnetic head to the track "0" position, a seek command (SEEK) for driving the magnetic head, a write command (WRDAT) for writing a data byte onto the floppy disk, a read command (RDDAT) for reading out the data byte, and a sense drive command (SDS) for inspecting the driving condition of the floppy disk. When no task is given the execution unit, the execution unit successively fetches instruction codes stored in a program memory (not shown), and sequentially produces the control signals LTCH2, TR1, and WR for accumulating these instruction codes into the first-in first-out register 1.

In detail, when an instruction code is transferred from the program memory to the input latching circuit 2, the execution unit supplies the latch signal LTCH2 to the input latching circuit 2, so that the instruction code is memorized in the input latching circuit 2. Subsequently, the transfer signal TR1 as well as the write timing signal WR are supplied to the input latching circuit 2 and the controlling circuit 5, and the transfer signal TR1 is ANDed with the write timing signal WR to produce the write control signal WCL. The input latching circuit 2 transfers the instruction code to the first-in first-out register 1 in the presence of the transfer signal TR1, and the instruction code is pushed onto the instruction stack. Thus, the control signals LTCH2, TR1 and WR are repeated in the instruction code transferring operation until the overflow warning signal OF is produced.

Upon execution of the instruction code, the execution unit produces the read-out signal RD and the write timing signal WR, and the instruction code is transferred from the first-in first-out register 1 to the internal register 3, and then is further transferred to the internal bus 4 in the presence of the transfer signal TR2. Thus, the execution unit merely produces the control signals WR, RD and TR2 for fetching the instruction codes, and, for this reason, the throughput of the instruction code stream is enhanced.

However, a problem is encountered in the prior art instruction stack in that the occurrence of an abnormal condition will result in the loss of this advantageous enhancement of the instruction code throughput. This is because of the fact that all of the instruction codes accumulated in the first-in first-out register 1 will be canceled when the reset signal RST is produced as a result of such an abnormal condition.

In detail, assuming that the first-in first-out register 1 accumulates eight instruction codes SPY to WRDAT#1 as labeled with Status 0 in FIG. 2, the execution unit fetches the first instruction code representative of the specify command SPY and executes the first instruction code, then fetching the second instruction code representative of the recalibration command RCL#0, and then executes the second instruction code. When the second instruction code is executed, only six instruction codes are left in the first-in first-out register 1 labeled with as Status 1. However, if an abnormal condition takes place in the floppy disk system, the execution unit supplies the reset signal RST to the first-in first-out register, and, for this reason, the six instruction codes are canceled. Then, the instruction code SDS representative of the sense drive command is transferred from the program memory to the input latching circuit 2 which in turn transfers the SDS command to the first-in first-out register 1. The first-in first-out register 1 in this status is labeled Status 2 in FIG. 2. When the instruction code representative of the command SDS is executed by the execution unit, the abnormal condition is removed, then the operation restarts by accumulating the instruction code identical with the second instruction code representative of the recalibration command RCL#0. The execution unit further accumulates the instruction codes respectively identical with the third, fourth, fifth, sixth and seventh instruction codes in Status 0 again. The first-in first-out register 1 at this stage is labeled with Status 3.

Thus, whenever the reset signal cancels the instruction codes accumulated in the first-in first-out register, the same instruction codes must be accumulated again in the first-in first-out register 1 (labeled with Status 4 in FIG. 2) after recovering from the abnormal condition. This results in a reduction in the throughput of the instruction code stream.

SUMMARY OF THE INVENTION

It is therefore an important object of the present invention to provide a first-in first-out storage facility which enhances the throughput of the code stream.

It is also an important object of the present invention to provide a first-in first-out storage facility which can retain the accumulated codes when an abnormal condition occurs.

To accomplish these objects, the present invention proposes to arrange main and auxiliary registers in parallel.

In accordance with the present invention, there is provided a storage facility provided in association with an execution unit communicable with a code source, a plurality of codes being provided from the code source, comprising: a) a first storage register operative to store the code transferred from the execution unit; b) a main storage register coupled to the first storage register and operative to accumulate the codes each supplied from the first storage register; c) an auxiliary storage register coupled to the first storage register and operative to store at least one code fed from the first storage register; d) a second storage register coupled to both of the main and auxiliary storage registers and operative to store the code supplied from either main or auxiliary storage register; and e) a controlling circuit responsive to control signals fed from the execution unit and operative to steer the code fed from the first storage register, in which the controlling circuit allows the main storage register to accumulate the codes in a normal condition, however, the code is transferred to the auxiliary storage register without canceling the codes accumulated in the main storage register if an abnormal condition is reported to the execution unit.

BRIEF DESCRIPTION OF THE DRAWINGS

The features and advantages of the first-in first-out storage facility according to the present invention will be more clearly understood from the following description taken in conjunction with the accompanying drawings in which.

DESCRIPTION OF THE PREFERRED EMBODIMENTS

First Embodiment

Figure 1:
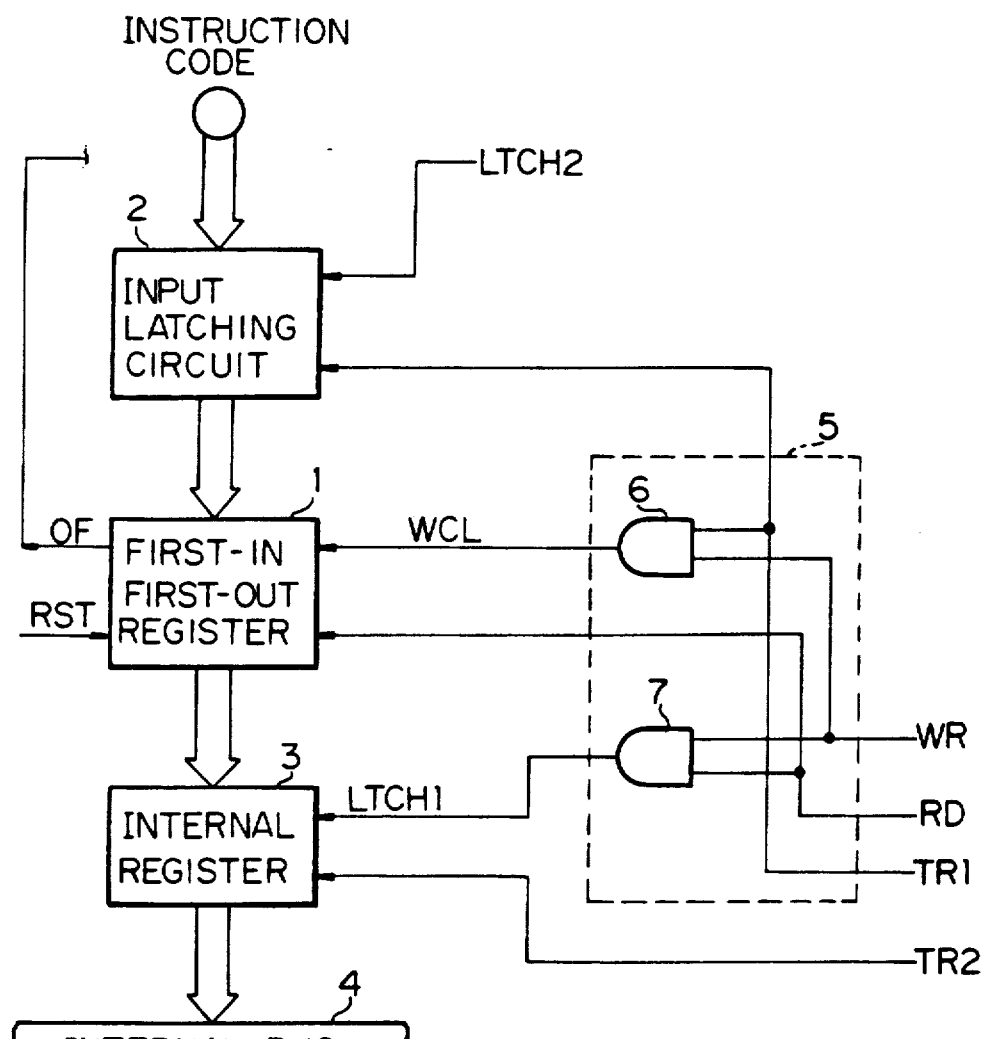
FIG. 1 is a circuit diagram showing the arrangement of a prior art first-in first-out storage facility.
Figure 2:
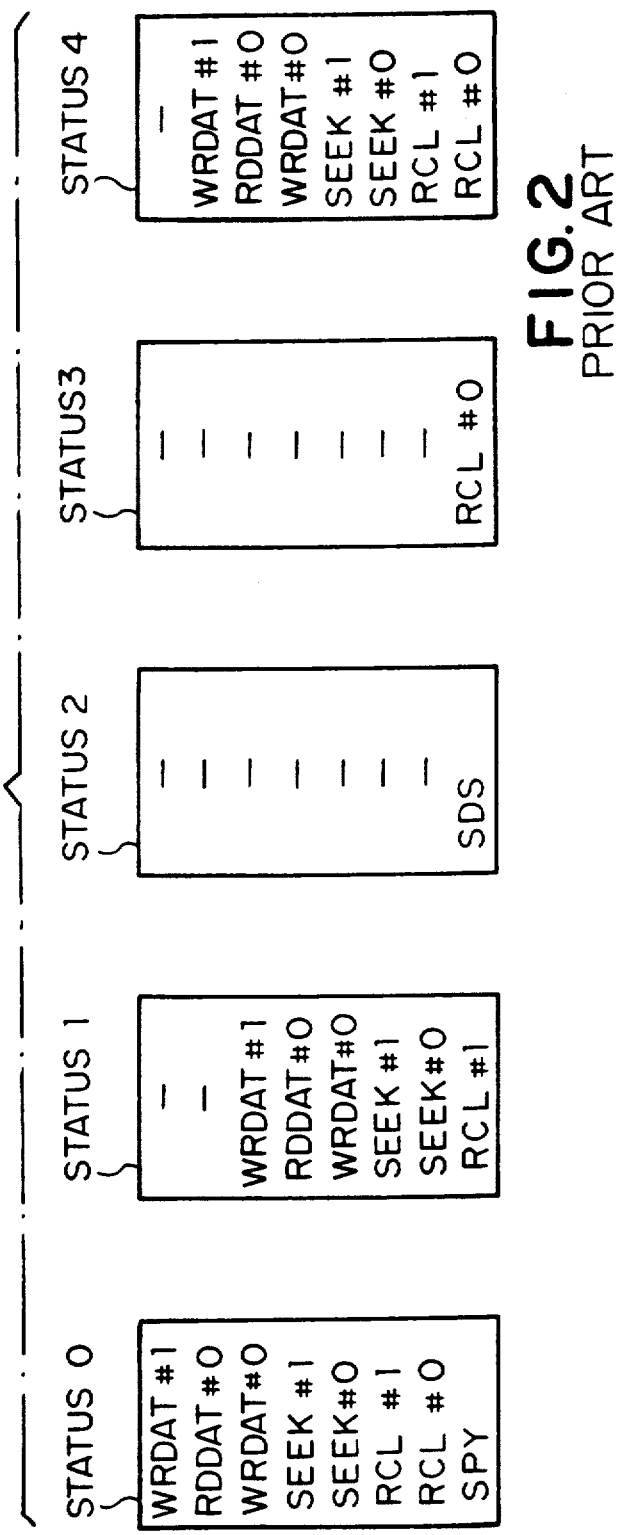
FIG. 2 is a flowchart showing a sequence of operations achieved by a prior art system provided with the first-in first-out storage facility shown in FIG. 1.
Figure 3:
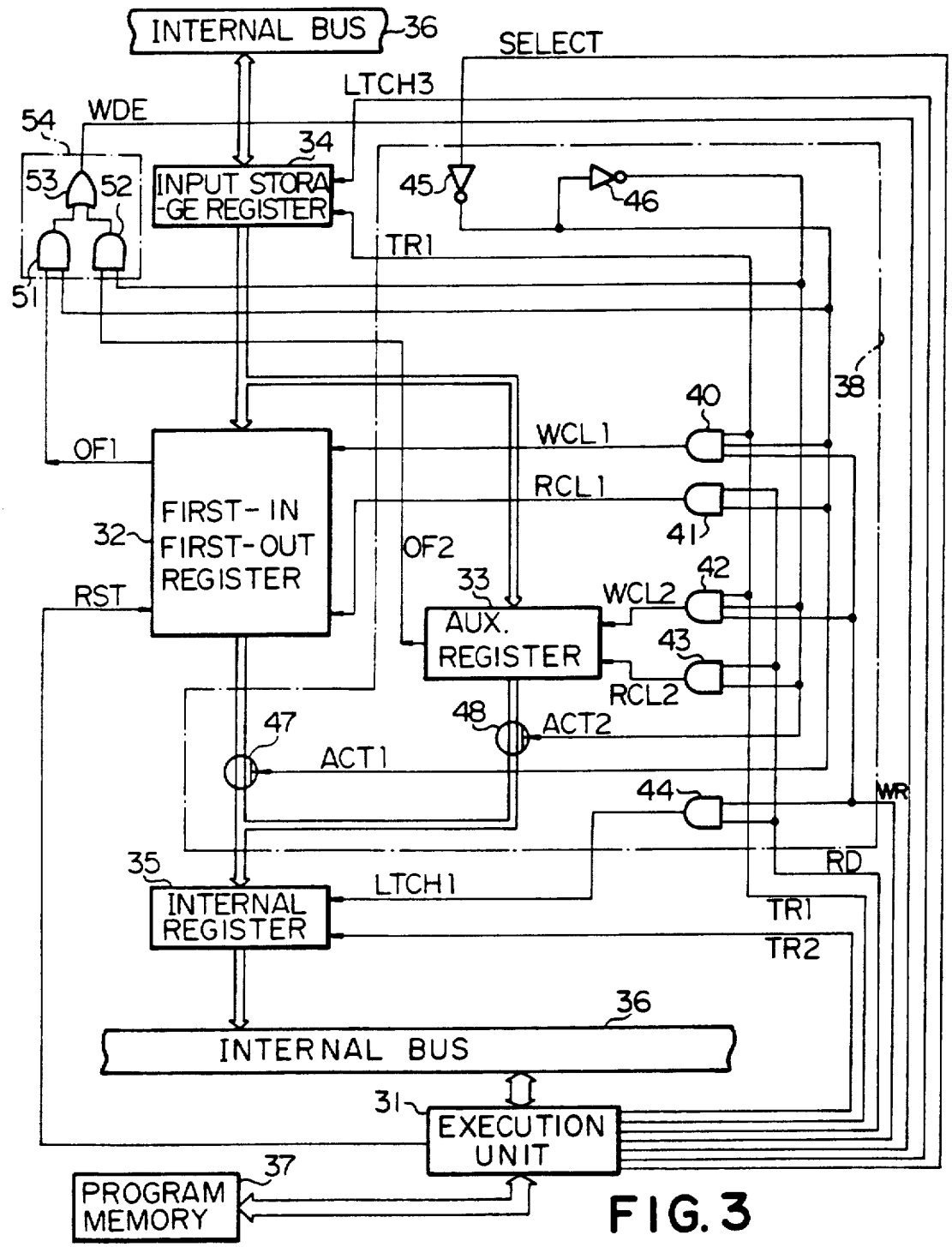
FIG. 3 is a circuit diagram showing the arrangement of a first-in first-out storage facility embodying the present invention.

Referring first to FIG. 3 of the drawings, a first-in first-out storage facility according to the present invention is provided in association with an execution unit 31, and largely comprises a first-in first-out register 32 serving as a main register, an auxiliary register 33, an input storage register 34 coupled in parallel to the first-in first-out register 32 and the auxiliary register 33, an internal register 35 coupled at the input port thereof to the first-in first-out register 32 and the auxiliary register 33 in a parallel fashion and at the output port thereof to an internal bus 36, and a controlling circuit 38. The input storage register 34 is coupled at the input port thereof to the internal bus 36, and the execution unit 31 transfers an instruction code from a program memory 37 through internal bus 36 to the input storage register 34.

The controlling circuit 38 comprises five AND gates 40, 41, 42, 43 and 44 and two inverter circuits 45 and 46, and dominates the respective operations of the input storage register 34, the first-in first-out register 32, the auxiliary register 33 and the internal register 35. The inverter circuit 45 is supplied with a selecting signal SELECT of active low voltage level indicative of the first-in first-out register 32, and produces an activation signal ACT1 fed to a first transfer gate circuit 47. The first transfer gate 47 is responsive to the activation signal, and establishes or blocks a conduction path between the first-in first-out register 32 and the internal register 35. The activation signal ACT1 is further supplied to the inverter circuit 46 to produce an activation signal ACT2 fed to a second transfer gate circuit 48, and the second transfer gate circuit 48 is responsive to the activation signal ACT2 for establishing a conduction path between the auxiliary register 33 and the internal register 35.

The execution unit 31 further provides various control signals to the controlling circuit 38, and the control signals include a write timing signal WR, a read-out signal RD and a transfer signal TR1. The AND gate 40 produces a first write control signal WCL1 in the concurrent presence of the transfer signal TR1, the activation signal ACT1 and the write timing signal WR, and the AND gate 41 produces a first read control signal RCL1 in the concurrent presence of the activation signal ACT1 and the read-out signal RD. The first write control signal WCL1 and the first read control signal RCL1 are supplied to the first-in first-out register 32 for accumulating and reading-out the instruction code, respectively.

The AND gate 42 produces a second write control signal WCL2 in the concurrent presence of the transfer signal TR1, the activation signal ACT2 and the write timing signal WR, and the AND gate 43 produces a second read control signal RCL2 in the concurrent presence of the read-out signal RD and the activation signal ACT2. The second write control signal WCL2 and the second read control signal RCL2 are supplied to the auxiliary register 33 for memorizing and reading out the instruction code, respectively. The activation signals ACT1 and ACT2 are complementarily shifted between the active high voltage levels and the inactive low voltage levels, and, for this reason, one of the first-in first-out register 32 and the auxiliary register 33 becomes ready for operation.

The AND gate 44 produces a latch signal LTCH1 in the concurrent presence of the write timing signal WR and the read-out signal RD, and the latch signal LTCH1 is supplied to the internal register 35 for memorizing the instruction code fed from the first-in first-out register 32. When the instruction code memorized in the internal register 35 is put onto the internal bus 36, a transfer signal TR2 is supplied from the execution unit 31 to the internal register 35.

The input storage register 34 is responsive to a latch signal LTCH3 fed from the execution unit 31 and memorizes the instruction code on the internal bus 36. The instruction code thus memorized is transferred to one of the first-in first-out register 32 and the auxiliary register 33 in the presence of the transfer signal TR1.

When the first-in first-out register 32 is filled with the instruction codes, an overflow warning signal OF1 is produced by the register 32. Similarly, the auxiliary register 33 produces an overflow warning signal OF2 if no memorizing space is left for a new instruction code. These overflow warning signals OF1 and OF2 are supplied to AND gates 51 and 52, respectively, and the activation signals ACT1 and ACT2 are also fed to the AND gates 51 and 52, respectively. The AND gates 51 and 52 are coupled to an OR gate for producing a write disenable signal WDE which is reported to the execution unit 31. The AND gates 51 and 52 and the OR gate 53 as a whole constitute a monitoring unit 54.

Figure 4:
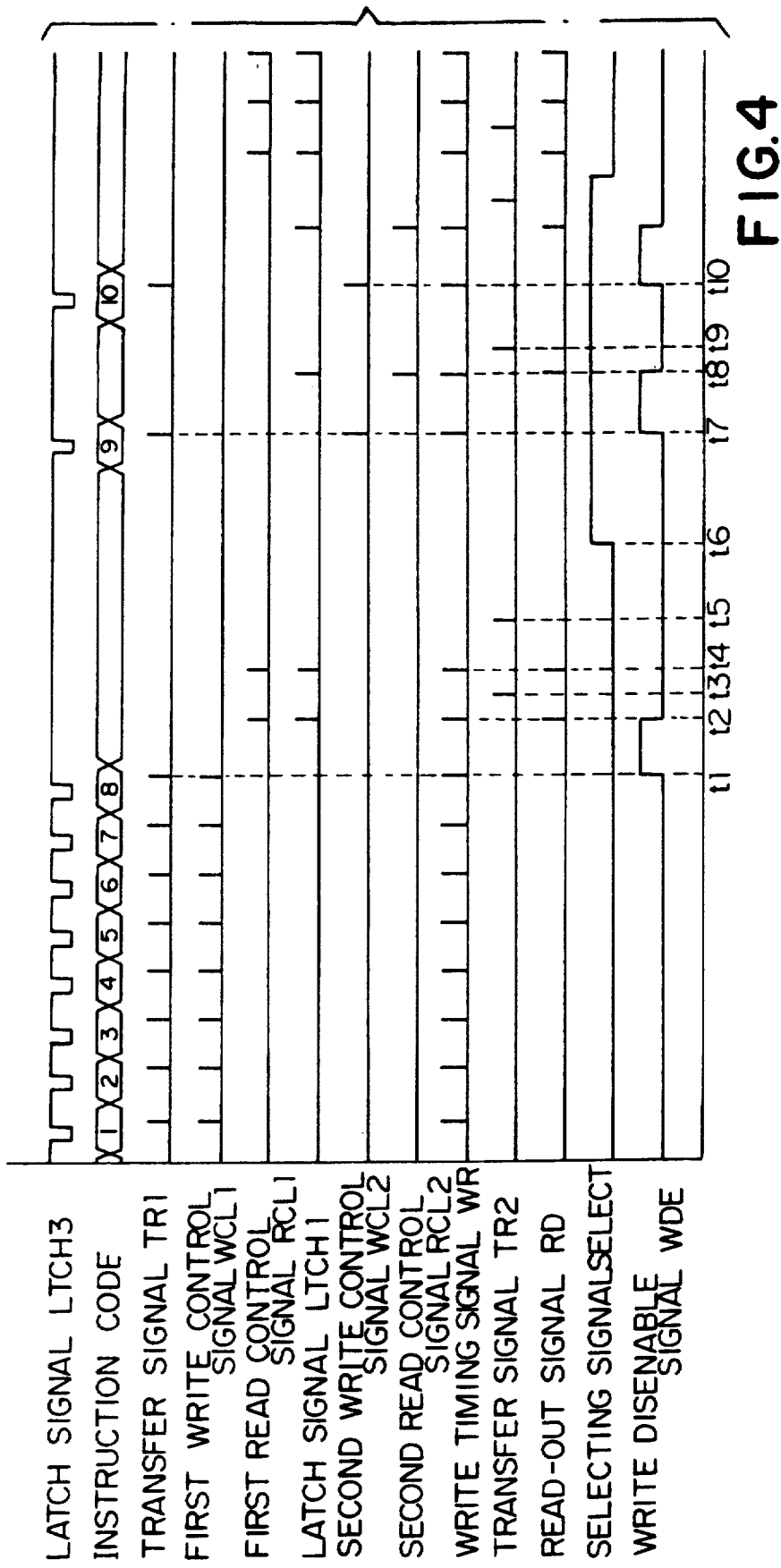
FIG. 4 is a timing chart showing the essential signals produced in the first-in first-out storage facility shown in FIG. 3.

The operation of the storage facility will be described with reference to FIGS. 4 and 5. Assuming now that the instruction stack and the execution unit 31 form a part of a floppy disk controller which in turn forms a part of a floppy disk driving system, the program memory 37 stores various instruction codes such as, for example, representative of a specify command (SPY) for initializing the controller, a recalibration command (RCL) for returning the magnetic head to the track "0" position, a seek command (SEEK) for driving the magnetic head, a write command (WRDAT) for writing a data byte into the floppy disk, a read command (RDDAT) for reading out the data byte, and a sense drive command (SDS) for inspecting the driving condition of the floppy disk. Though not shown in the drawings, a magnetic head is communicable with the floppy disk controller for writing in or reading out from a floppy disk.

When no controlling task is applied to the execution unit 31, the execution unit 31 is branched to an instruction code accumulation subroutine program. In the instruction code accumulation subroutine program, the execution unit 31 successively transfers eight instruction codes (which are labeled with 1,2,3 to 8 in FIG. 4) in synchronization with the eight latch signals LTCH3, respectively, and further produces the eight transfer signals TR1 and the eight write timing signals WR. Since the selecting signal SELECT goes down to the active low voltage level and, accordingly, the activation signal ACT1 goes up to the active high voltage level, the AND gate 40 activates the first-in first-out register 32 with the first write control signal WCL1, and, for this reason, the eight instruction codes 1 to 8 are sequentially memorized in the first-in first-out register 32. Thus, the first-in first-out register 32 is filled with the instruction codes 1 to 8 by time t1. When the first-in first-out register 32 is filled up, the overflow warning signal OF1 is supplied from the first-in first-out register 32 to the AND gate 51. The activation signal ACT1 has been already supplied to the AND gate 51, so that the AND gate 51 allows the OR gate 53 to produce the write disenable signal WDE which is reported to the execution unit 31.

Figure 5:
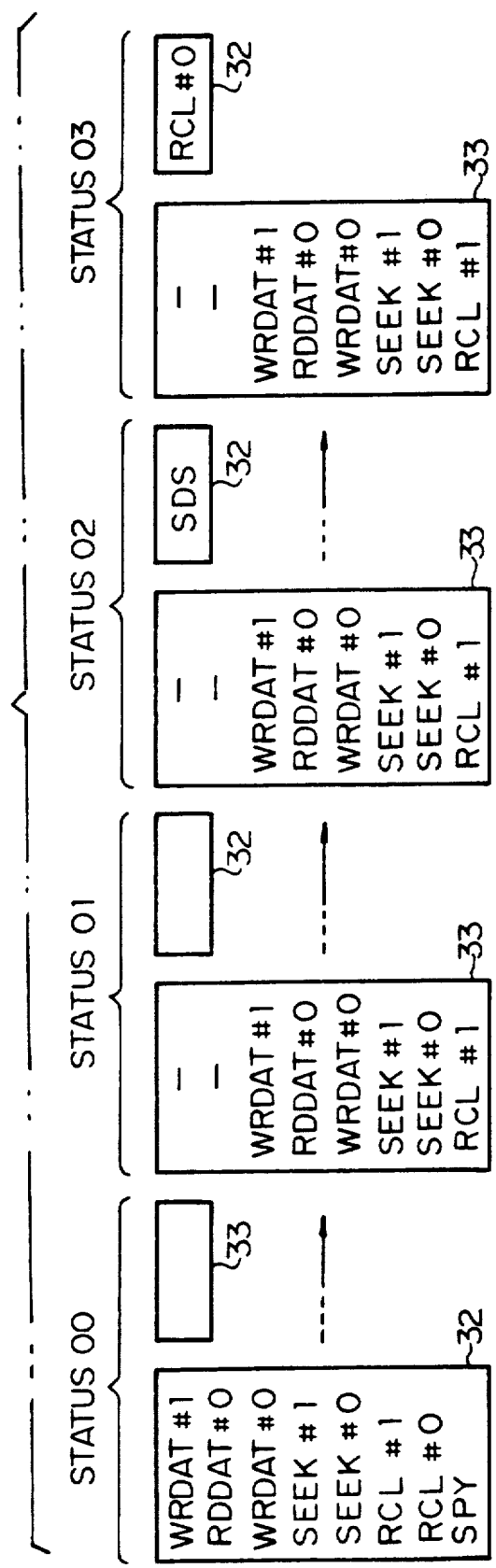
FIG. 5 is a flowchart showing a sequence of operations achieved by the first-in first-out storage facility shown in FIG. 3.

Assuming now that the eight instruction codes 1 to 8 are representative of the specify command SPY, the recalibration command RCL#0, the recalibration command RCL#1, the seek command SEEK#0, the seek command SEEK#1, the write command WRDAT#0, the read command RDDAT#0 and the write command WRDAT#1, the first-in first-out register 32 is schematically shown as Status 00 in FIG. 5, and no instruction code is stored in the auxiliary register 33.

When the execution unit 31 returns from the instruction code accumulation subroutine program, the read-out signals RD are supplied from the execution unit 31 to the AND gate 41. The activation signal ACT1 remains in the active high voltage level, so that the AND gate 41 produces the first read control signals RCL1 in synchronization with the read-out signals RD. With the first read control signal RCL1, the first-in first-out register 32 puts the instruction codes on the output port thereof, and the instruction codes pass though the first transfer gate circuit 47 in the presence of the activation signal ACT1. The execution unit 31 further supplies the write timing signals WR, so that the AND gate 44 produces the latch signals LTCH1, and, accordingly, the instruction codes 1 and 2 are memorized in the internal register 35 at times t2 and t4, respectively. Since the execution unit 31 produces the transfer signal TR2 at time t3, the instruction code 1 is transferred from the internal register 35 through the internal bus 36 to the execution unit 31 before time t4. The instruction code 2 is similarly transferred from the internal register 35 to the execution unit 31 in the presence of the transfer signal TR2 at time t5. When the first instruction code 1 is transferred to the execution unit 31, the overflow warning signal OF1 and, accordingly, the write disenable signal WDE are recovered to the inactive low voltage level. Status 01 is established in the first-in first-out register 32 and the auxiliary register 33 as shown in FIG. 5.

If, after time t5, an abnormal event is reported to the execution unit 31, the selecting signal SELECT is recovered to the inactive high voltage level, and, accordingly, the activation signal ACT2 goes up to the active high voltage level instead of the activation signal ACT1 at time t6. The execution unit 31 transfers the instruction code 9 representative of the sense drive command SDS for inspection of the floppy disk driver in synchronization with the latch signal LTCH3. The instruction code 9 is memorized in the input storage register 34, and the input storage register 34 transfers the instruction code 9 in the presence of the transfer signal TR1 at time t7. The execution unit 31 further produces the write timing signal WR, and the AND gate 42 produces the second write control signal WCL2 in the presence of the activation signal ACT2. This results in that the instruction code 9 being transferred from the input storage register 34 to the auxiliary register 33, and, for this reason, no reset signal RST is supplied to the first-in first-out register 32. In other words, the instruction codes 3 to 8 are not canceled when the abnormal condition occurs, and the first-in first-out register 32 and the auxiliary register 33 are established in Status 02. When the instruction code 9 is memorized in the auxiliary register 33, the overflow warning signal OF2 is supplied to the AND gate 52, and the AND gate 52 allows the OR gate 53 to produce the write ACT2. The instruction code 9 is read out from the auxiliary register 33 through the second transfer gate circuit 48 to the internal register 35 in the concurrent presence of the read-out signal RD and the activation signal ACT2 at time t8. The instruction code is memorized in the internal register 35, and is further transferred through the internal bus 36 to the execution unit 31 in the presence of the transfer signal TR2 at time t9. Of course, the overflow warning signal OF2 and the write disenable signal WDE are recovered to the inactive low voltage level at time t8.

Subsequently, the execution unit 31 transfers the instruction code 10 representative of the recalibration command RCL#0. Since the selecting signal SELECT remains in the high voltage level, the instruction code 10 is memorized in the auxiliary register 33 through the input storage register 34 at time t10. No reset signal RST is transferred from the execution unit 31 to the first-in first-out register 32, so that the instruction codes 3 to 8 are maintained therein without any destruction. The instruction code 10 is transferred to the execution unit 31, and the magnetic head returns to the track "0".

Thus, the instruction codes 9 and 10 are transferred to the execution unit 31 through the auxiliary register 33, and, accordingly, no destruction takes place of the accumulated instruction codes in the first-in first-out register 32. This results in sequential transfer operations being unnecessary upon restarting the controlling job, and, for this reason, the throughput of the instruction code stream does not deteriorate even if any abnormal condition takes place.

Second Embodiment

Figure 6:
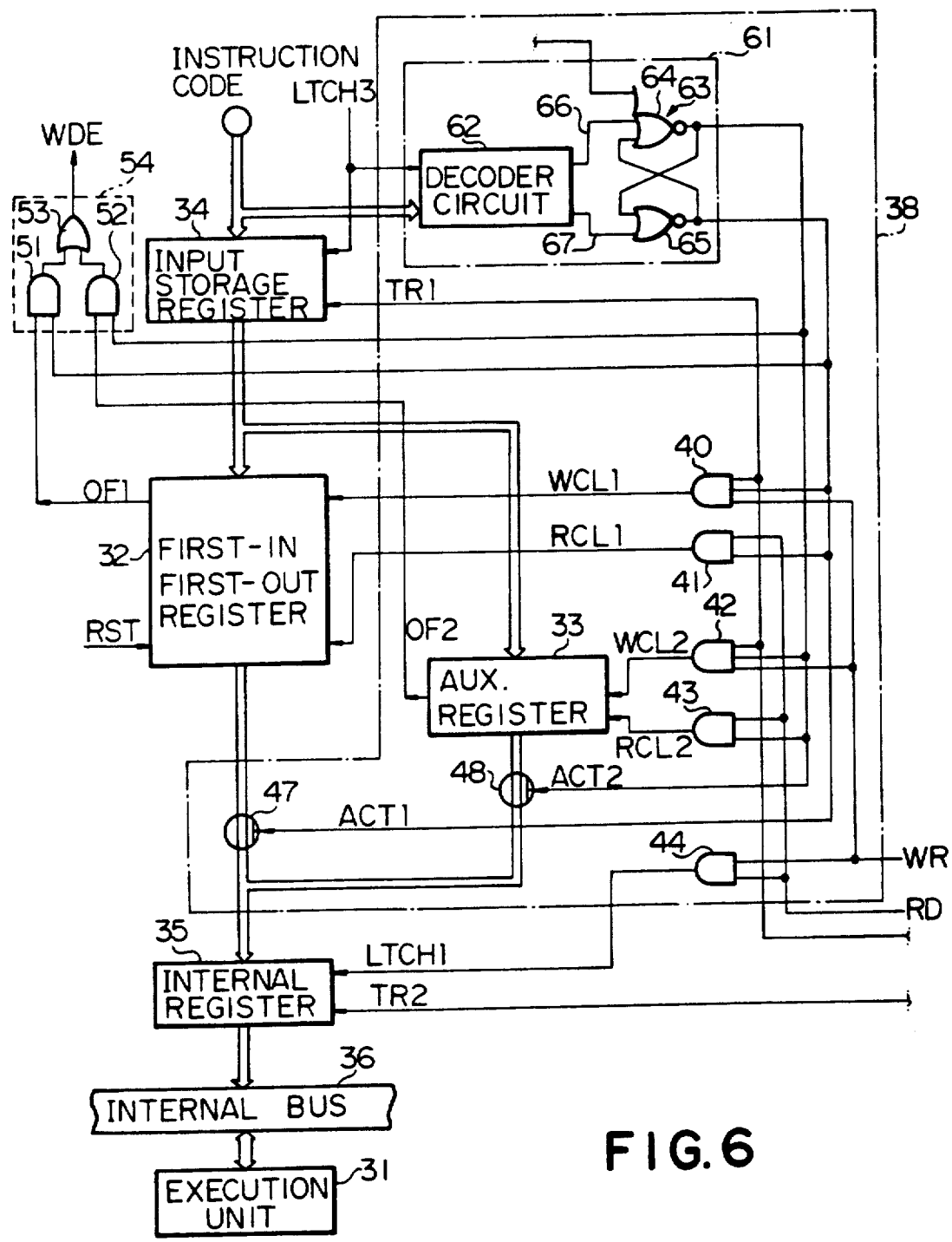
FIG. 6 is a circuit diagram showing the arrangement of another first-in first-out storage facility embodying the present invention.

Turning to FIG. 6 of the drawings, there is shown another first-in first-out storage facility embodying the present invention. The first-in first-out storage facility shown in FIG. 6 is similar in arrangement to that shown in FIG. 3 with the exception of a shifting unit 61 used for producing the activation signals ACT1 and ACT2, and, for this reason, corresponding units and circuits are denoted by like reference numerals used in FIG. 3 without any detail description.

The shifting unit 61 comprises a decoder circuit 62 and a flip flop circuit 63 provided with two NOR gates 64 and 65. The decoder circuit 62 is responsive to the latch signal LTCH3 and is operative to decode the instruction code supplied from the execution unit 31. The instruction code supplied to the decoder circuit 62 is representative of the selection between the first-in first-out register 32 and the auxiliary register 33. When the instruction code is representative of the selection of the first-in first-out register 32, the decoder circuit 62 supplies a reset signal 66 to the NOR gate 64, so that the NOR gate produces the actuation signal ACT1. On the other hand, if the instruction code is indicative of the selection of the auxiliary register 33, the decoder circuit 62 supplies the NOR gate 65 with a set signal. With the set signal 67, the NOR gate 64 produces the activation signal ACT2. Thus, the activation signals ACT1 and ACT2 are produced on the basis of the instruction code, so that no signal line is necessary for the selecting signal SELECT.

Although particular embodiments of the present invention have been shown and described, it will be obvious to those skilled in the art that various changes and modifications may be made without departing from the spirit and scope of the present invention. For example, although the embodiments described above are used as an instruction stack, the first-in first-out storage facility may also implement a data code stack, for example.

What is claimed is:

1. A storage facility provided in association with an execution unit communicable with a code source, a plurality of codes being provided from said code source, comprising:

a) a first storage register operative to store a code transferred from said execution unit;

b) a main storage register implemented by a first-in first-out register coupled to said first storage register and operative to accumulate codes supplied from the first storage register;

c) an auxiliary storage register coupled to said first storage register and operative to store at least one code fed from said first storage register;

d) a second storage register coupled to both of said main and auxiliary storage registers and operative to store a code supplied from either said main or said auxiliary storage register; and e) a controlling circuit responsive to control signals fed from said execution unit and operative to steer a code fed from said first storage register, said controlling circuit allowing said main storage register to accumulate said codes in a normal condition, and causing said at least one code to be transferred to said auxiliary storage register without canceling the codes accumulated in said main storage register if an abnormal condition is reported to said execution unit;

f) said auxiliary storage register thereby providing a bypass for conducting said at least one code, from said first storage register to said second storage register, via said auxiliary storage register, when said abnormal condition is reported;

g) said execution unit producing a selecting signal representative of a selection between said main storage register and said auxiliary storage register; and h) said controlling circuit comprising a first gate circuit coupled between said main storage register and said second storage register, a second gate circuit coupled between said auxiliary storage register and the second storage register, a first inverter circuit supplied with said selecting signal and producing a first activation signal for allowing the first gate circuit to turn on, and a second inverter circuit supplied with the first activation signal and producing a second activation signal for allowing the second gate circuit to turn on.

2. A storage facility as set forth in claim 1, in which said execution unit further produces a first transfer signal and a first latch signal, and in which said first storage register is responsive to said first latch signal for memorizing said code and is further responsive to said first transfer signal for transferring the code to either main or auxiliary storage register depending upon the selecting signal.

3. A storage facility as set forth in claim 2, in which said execution unit further produces a write timing signal and a read-out signal, and in which said controlling circuit further comprises a first AND gate operative to produce a first write control signal in the concurrent presence of said first activation signal, said first transfer signal and said write timing signal for allowing said main storage register to store said code supplied from said first storage register, a second AND gate operative to produce a first read control signal in the concurrent presence of said first activation signal and said read-out signal for allowing said main storage register to transfer the code to said second storage register, a third AND gate operative to produce a second write control signal in the concurrent presence of said second activation signal, the first transfer signal and the write timing signal for allowing said auxiliary storage register to store the code supplied from the first storage register, and a fourth AND gate operative to produce a second read control signal in the concurrent presence of the second activation signal and the read-out signal for allowing the auxiliary storage register to transfer the code to the second storage register.

4. A storage facility as set forth in claim 3, in which said execution unit further produces a second transfer signal for allowing said second storage register to store said code supplied from either said main or said auxiliary storage register, and in which said controlling circuit further comprises a fifth AND gate operative to produce a second latch signal in the concurrent presence of said write timing signal and said read-out signal for allowing said second storage register to transfer the code to said execution unit.

5. A storage facility as set forth in claim 4, in which said main and said auxiliary storage registers produce respective overflow warning signals when the main and auxiliary storage resisters are filled with said codes or said at least one code, respectively, and in which said storage facility further comprises a monitoring unit operative to produce a write disenable signal in the presence of one of the overflow warning signals.

6. A storage facility as set forth in claim 5, in which said storage facility provides an instruction stack.

7. A storage facility as set forth in claim 1, in which said execution unit produces a selecting signal representative of a selection between said main storage register and said auxiliary storage register, and in which said controlling circuit comprises a first gate circuit responsive to said selecting signal coupled between said main storage register and said second storage register, and a second gate circuit responsive to said selecting signal coupled between said auxiliary storage register and the second storage register.

8. A storage facility provided in association with an execution unit communicable with a code source, a plurality of codes being provided from said code source, comprising:
   a) a first storage register operative to store a code transferred from said execution unit;
   b) a main storage register implemented by a first-in first-out register coupled to said first storage register and operative to accumulate codes supplied from the first storage register;
   c) an auxiliary storage register coupled to said first storage register and operative to store at least one code fed from said first storage register;
   d) a second storage register coupled to both of said main and auxiliary storage registers and operative to store a code supplied from either said main or said auxiliary storage register; and
   e) a controlling circuit responsive to control signals fed from said execution unit and operative to steer a code fed from said first storage register, said controlling circuit allowing said main storage register to accumulate said codes in a normal condition, and causing said at least one code to be transferred to said auxiliary storage register without canceling the codes accumulated in said main storage register if an abnormal condition is reported to said execution unit;
   f) said auxiliary storage register thereby providing a bypass for conducting said at least one code, from said first storage register to said second storage register, via said auxiliary storage register, when said abnormal condition is reported;
   g) said controlling circuit comprising a shifting unit responsive to one of said codes to produce a first or second activation signal, a first gate circuit coupled between said main storage register and said second storage register and providing a conduction path in the presence of the first activation signal, and a second gate circuit coupled between said auxiliary storage register and the second storage register and providing a conduction path in the presence of the second activation signal.

9. A storage facility provided in association with an execution unit communicable with a code source, a plurality of codes being provided from said code source, comprising:
   a) a first storage register operative to store a code transferred from said execution unit;
   b) a main storage register implemented by a first-in first-out register coupled to said first storage register and operative to accumulate codes supplied from the first storage register;
   c) an auxiliary storage register coupled to said first storage register and operative to store at least one code fed from said first storage register;
   d) a second storage register coupled to both of said main and auxiliary storage registers and operative to store a code supplied from either said main or said auxiliary storage register; and
   e) a controlling circuit responsive to control signals fed from said execution unit and operative to steer a code fed from said first storage register, said controlling circuit allowing said main storage register to accumulate said codes in a normal condition, and causing said at least one code to be transferred to said auxiliary storage register without canceling the codes accumulated in said main storage register if an abnormal condition is reported to said execution unit;
   f) said auxiliary storage register thereby providing a bypass for conducting said at least one code, from said first storage register to said second storage register, via said auxiliary storage register, when said abnormal condition is reported;
   g) said controlling circuit comprising a shifting unit responsive to one of said codes to produce a first or second activation signal, a first gate circuit coupled between said main storage register and said second storage register and providing a conduction path in the presence of the first activation signal, and a second gate circuit coupled between said auxiliary storage register and the second storage register and providing a conduction path in the presence of the second activation signal;
   h) said shifting unit comprising a decoder circuit supplied with said one of the codes, and a flip flop circuit shifted by the decoder circuit to produce said first and second activation signals.

10. A storage facility as set forth in claim 9, in which said execution unit further produces a first transfer signal and a first latch signal, and in which said first storage register is responsive to said first latch signal for memorizing said code and is further responsive to said first transfer signal for transferring the code to either main or auxiliary storage register& depending upon the selecting signal.

11. A storage facility as set forth in claim 10, in which said execution unit further produces a write timing signal and a read-out signal, and in which said controlling circuit further comprises a first AND gate operative to produce a first write control signal in the concurrent presence of said first activation signal, said first transfer signal and said write timing signal for allowing said main storage register to store said code supplied from said first storage register, a second AND gate operative to produce a first read control signal in the concurrent presence of said first activation signal and said read-out signal for allowing said main storage register to transfer the code to said second storage register, a third AND gate operative to produce a second write control signal in the concurrent presence of said second activation signal, the first transfer signal and the write timing signal for allowing said auxiliary storage register to store the code supplied from the first storage register, and a fourth AND gate operative to produce a second read control signal in the concurrent presence of the second activation signal and the read-out signal for allowing the auxiliary storage register to transfer the code to the second storage register.

12. A storage facility as set forth in claim 11, in which said execution unit further produces a second transfer signal for allowing said second storage register to store said code supplied from either main or auxiliary storage register, and in which said controlling circuit further comprises a fifth AND gate operative to produce a second latch signal in the concurrent presence of said write timing signal and said read-out signal for allowing said second storage register to transfer the code to said execution unit.

13. A storage facility as set forth in claim 12, in which said main and said auxiliary storage registers produce respective overflow warning signals when the main and auxiliary storage registers are filled with said codes or said at least one code, respectively, and in which said storage facility further comprises a monitoring unit operative to produce a write disenable signal in the presence of one of the overflow warning signals.

14. A storage facility as set forth in claim 13, in which said storage facility provides an instruction stack.

* * * * *